350-432 SR CROSS REFERENCE
XR 2,746,030
TX 2034
May 15, 1956 R. SCHRECONGOST 2,746,030
IMAGE REPRODUCING DEVICE LENS STRUCTURE
Filed Oct. 30, 1952 2 Sheets-Sheet 1
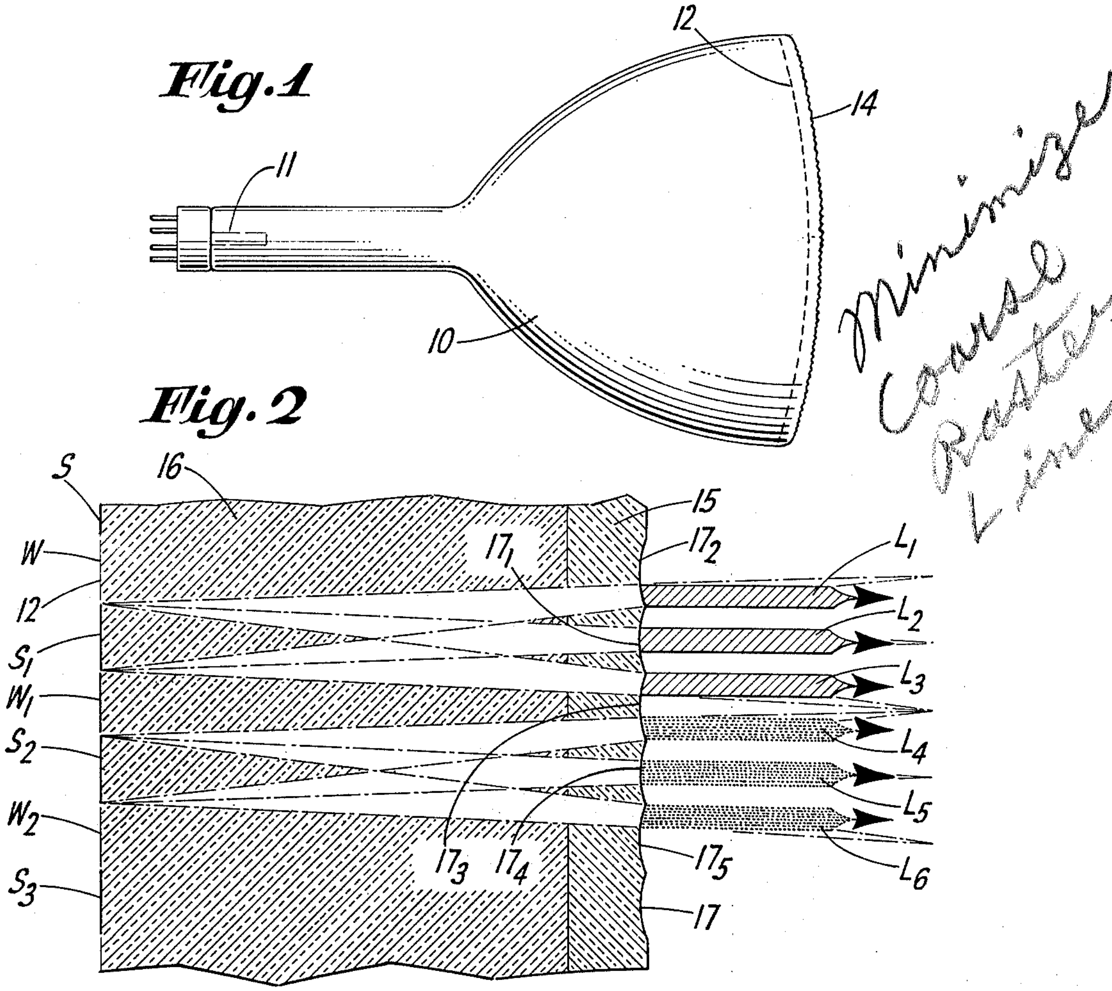
Fig. 1 Fig. 2
Minimizes Coarse Raster Lines.
Fig. 5
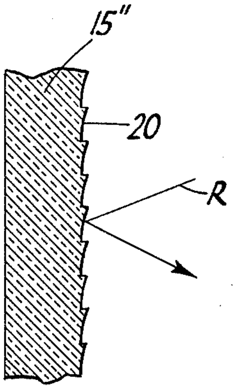
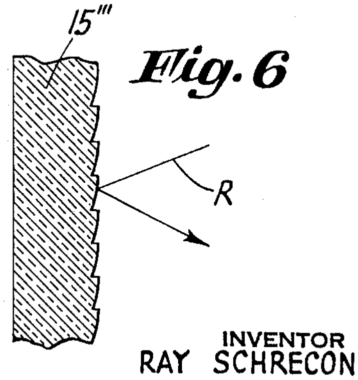
INVENTOR
RAY SCHRECONGOST
BY John A. Harvey
ATTORNEY
2746030
OR IN 358/251

May 15, 1956 R. SCHRECONGOST 2,746,030

IMAGE REPRODUCING DEVICE LENS STRUCTURE

Filed Oct. 30, 1952 2 Sheets-Sheet 2

INVENTOR
RAY SCHRECONGOST
BY John R. Harvey
ATTORNEY

United States Patent Office 2,746,030

Patented May 15, 1956

2,746,030

IMAGE REPRODUCING DEVICE LENS STRUCTURE

Ray Schrecongost, Kenmore, N. Y., assignor to Sylvania Electric Products Inc., a corporation of Massachusetts Application October 30, 1952, Serial No. 317,694

7 Claims. (Cl. 340—369)

The present invention relates to a lens structure for a television image reproducing device, and particularly to a structure having a raster of contiguous elongated lens elements used in closely spaced relation to a raster of line traces formed by the reproducing device in the reproduction of a television image.

Conventional television systems transmit and reproduce images by the method of successively scanning incremental elements of an image area, the scansion being in the nature of a raster of parallel line traces. For home entertainment, where radio transmissions are employed, restrictions on the band-width of transmission have established as a standard that there shall be 525 scanning lines traced along each complete image frame. Not all of these lines may be utilized for the image reproduction, some being lost during the field retrace intervals, so that about 475 lines remain for utilization and this establishes the limit of vertical resolution in the image. Optimum vertical resolution results when the scanning lines have equal widths and are effectively contiguous without any space between them. Due to the so-called "aperture" effect, however, this condition may slightly impair resolution along the horizontal lines which will be optimized (insofar as the scanning action is concerned) by relatively fine scanning lines with substantial spacings between them. A reasonably good compromise between these incompatible conditions is one wherein the scanning line traces are of equal width and are separated by a space equal approximately to the trace width. While this compromise is satisfactory for relatively small images where the human eye even at close viewing distances does not resolve the line structure as thus made up, the line spacings become quite apparent and somewhat objectionable even at normal viewing distances for large image areas such as those furnished by cathode-ray image reproducing devices of 21″ size and larger.

To avoid the relatively coarse line structure last mentioned, it has been suggested that the electron gun of a cathode-ray image reproducing device be constructed to produce a beam of elliptical cross-section having its major axis arranged vertically of the image area. It has been found in practice that this suggestion greatly complicates the gun construction and thus far has not proven a practical solution to the problem.

It has further been proposed that the coarse line structure be somewhat reduced by the use of a high-frequency oscillator supplying oscillatory energy to the scanning field of the tube rapidly to oscillate the scanning beam in a vertical direction. This proposal obviously complicates the scanning system, increases its expense, and requires additional scanning power.

It is an object of the present invention to provide a new and improved lens structure for a television image reproducing device which is effective to minimize the undesirable effect of a relatively coarse scanning line raster while avoiding one or more of the limitations and disadvantages of prior arrangements proposed for this purpose.

It is a further object of the invention to provide a novel lens structure for a television image reproducing device which optically reduces the coarseness of scanning line structure yet is of relatively simple and inexpensive construction and is highly effective for the purpose intended.

It is an additional object of the invention to provide a novel lens structure for optically improving the vertical resolution of a reproduced television image while at the same time reducing the undesirable effect from stray light incident upon the image reproducing area at such an angle as to be reflected into the eyes of an observer.

For a better understanding of the invention, together with other and further objects thereof, reference is had to the following description taken in connection with the accompanying drawing in which:

Fig. 1 illustrates a cathode-ray tube type of television image reproducing device embodying the present invention;

Fig. 2 illustrates an enlarged cross-sectional view of a fragmentary portion of the Fig. 1 device image screen and is used to illustrate the details of a lens structure embodying the present invention in one form;

Figs. 5 and 6 are enlarged cross-sectional views illustrating embodiments of the invention in yet additionally modified forms.

Figure 3:
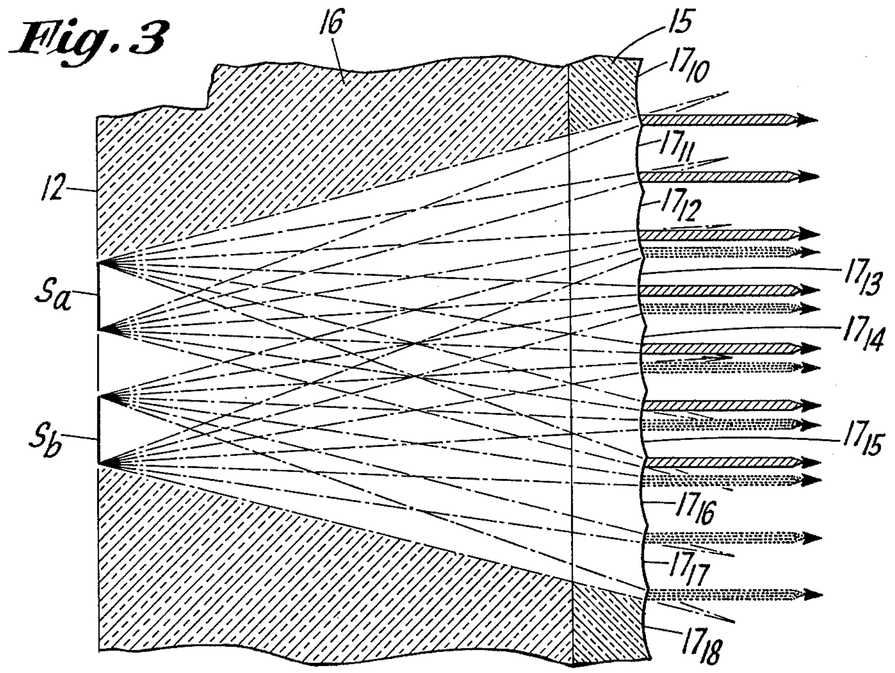
Fig. 3 is an enlarged cross-sectional fragmentary view similar to Fig. 2 but illustrating the result obtained for a different value of the focal lengths of the elemental lens employed in the lens structure.

Referring now more particularly to Fig. 1, there is illustrated a cathode-ray tube type of television image reproducing device 10 which conventionally includes an electron gun 11 used to develop a beam or pencil of electrons and project them toward a fluorescent screen 12 upon which an image is to be reproduced in conventional manner. In accordance with the present invention, a lens structure 14 is provided on the forward exterior surface of the tube 10 and comprises a lenticular surface positioned in spaced relation to the fluorescent screen 12 and formed of substantially contiguous elongated lens elements positioned for use substantially parallel to the line traces produced on the fluorescent screen 12 during the reproduction of a television image.

The lens structure 14 may be formed integrally with the surface of the glass face plate of the tube 10, but as shown in the enlarged cross-sectional fragmentary view of Fig. 2, preferably is formed by providing the elemental lenses in one surface of a member 15 of thin transparent sheet material. In use, the member 15 is placed in contact with the glass face plate 16 of the image reproducing device. In Fig. 2, S, $S_1$, $S_2$, and $S_3$ represent luminous line traces produced on the fluorescent screen 12 of the reproducing device while the non-luminous or dark spaces between these lines are indicated as W, $W_1$, and $W_2$. It will be seen that the trace lines have equal widths and are separated by a space approximately equal to a trace width. The dark spaces W, $W_1$, $W_2$, etc., between the brightly illuminated line traces S, $S_1$, $S_2$, $S_3$, etc., become quite objectionably apparent at normal viewing distances when the image reproducing device provides a relatively large image area such as that furnished by a picture tube of 21″ size or larger. It is the purpose of the lens structure optically to change the width of each line trace S without effecting any similar enlargement or magnification in a direction along the line trace. Actually, each such line trace is produced by a cathode-ray beam which conventionally has circular cross-section so that at any instant only an intensely bright circular spot is produced on the fluorescent screen 12 during the scanning action. The lens structure effectively optically distorts this circular light spot into one of elliptical configuration as seen by an observer. To this end, the member 15 has formed in one of its surfaces a plurality of elongated cylindrical lens elements 17 here shown as being formed in the front surface of the member 15 and of the negative-divergent or concave type. An advantage of the negative form of lens is that it greatly reduces the visual effect of slight vertical erratic shifting of positions of the trace lines, a condition commonly called "jitter." The radius of curvature of the lens elements is shown exaggerated for purposes of illustration, but in practice it will usually be of the order of one-half the spacing of the lens elements from the screen 12. Each lens element is shown as having a width equal approximately to the width of a line trace S, and each ordinarily has substantially uniform cross-sectional configuration along the lens length since the face plate 16 is usually of uniform thickness over its image area. For face plates of nonuniform thickness from its central portion to its edges, the lens widths and cross-sectional configuration along their length may be gradulated to take into account the differences of spacing of lens portions from the fluorescent screen 12 due to such varying values of thickness of the face plate. The lens elements are positioned for operation substantially parallel to the line traces. The radius of curvature of each lens element may be established by conventional lens formulae taking into account the indices of refraction of the member 15 and face plate 16. The lens width is ordinarily an independent quantity and the only material consideration involved in its selection is, aside from the desired magnification of the trace line width, that it should not be so large as to create objectionable moire effect created by lack of precise parallelism between the lens elements and scanning line traces. Having selected the lens width, and knowing the spacing between the lens elements and the screen 12 the focal length of the lens elements is selected to provide the desired line trace spread or magnification.

In operation, and by proper selection of the design parameters of the lens elements, a lens element $17_1$ centered upon the line trace $S_1$ and each adjacent lens element $17_2$ and $17_3$ cntered upon adjacent dark spaces W and $W_1$ will project parallel rays of light $L_1$, $L_2$ and $L_3$ from the line trace $S_1$ but no other lens element in the lens structure will be capable of projecting similar parallel rays of light from this particular line trace. In similar fashion, only the three lens elements $17_3$, $17_4$, and $17_5$ will project parallel rays of light from the line trace $S_2$. Thus each line trace is projected by three adjacent lens elements to the observer, and the projection is such that the width of the line at the point of observation is effectively enlarged or magnified. By proper selection of the focal length of the lens elements in relation to their spacing from the fluorescent screen 12, the projected rays of light $L_1$—$L_6$ (and similar rays from other line traces) have equal widths in the vertical direction and are equally spaced as indicated. The effective magnification of a line trace thus obtained is equal to twice the width of the line trace, thereby optically illuminating the dark spaces W between the line traces. While Fig. 2 illustrates the mode of projection provided by the lens structure to a point of observation normal to the member 15, it will be apparent and can easily be shown that similar substantially parallel rays of light will be projected in similar fashion to points of observation at substantial angles to a plane normal to the member 15.

For a 21" picture tube which provides an image area approximately 13½" high, the width of each scanning line S is usually chosen to be approximately 1/32" and its face plate 16 is approximately ¼" thick. If the member 15 is selected to have a thickness of say 1/32", the lens elements 17 will be found to have a radius of curvature of the order of 5/32" to provide parallel projected beams of light of equal beam thickness and spacing. For these parameters of the lens elements, theory indicates and experience shows that there is neither a significant light gain nor loss occasioned by use of the invention as compared to the light output of a conventional picture tube.

Fig. 3 is an enlarged cross-sectional view illustrating the effect of choosing a focal length for the elemental lens 17 of too small a value. Here it will be observed that the line trace $S_a$ is now projected to an observer by seven lens elements $17_{10}$—$17_{16}$ while the line trace $S_b$ is similarly projected by seven lens elements $17_{13}$—$17_{18}$. It is apparent that the width of the line trace has now been so greatly magnified that adjacent line traces effectively overlap by approximately two-thirds of a trace width. This is an undesirable condition since it impairs the vertical resolution in a reproduced image. The condition illustrated is one of over magnification of the line trace, and it can similarly be shown that elemental lenses with too large a value of focal length result in insufficient magnification with consequent failure completely to eliminate the observed dark spaces between the line traces.

Figure 4:
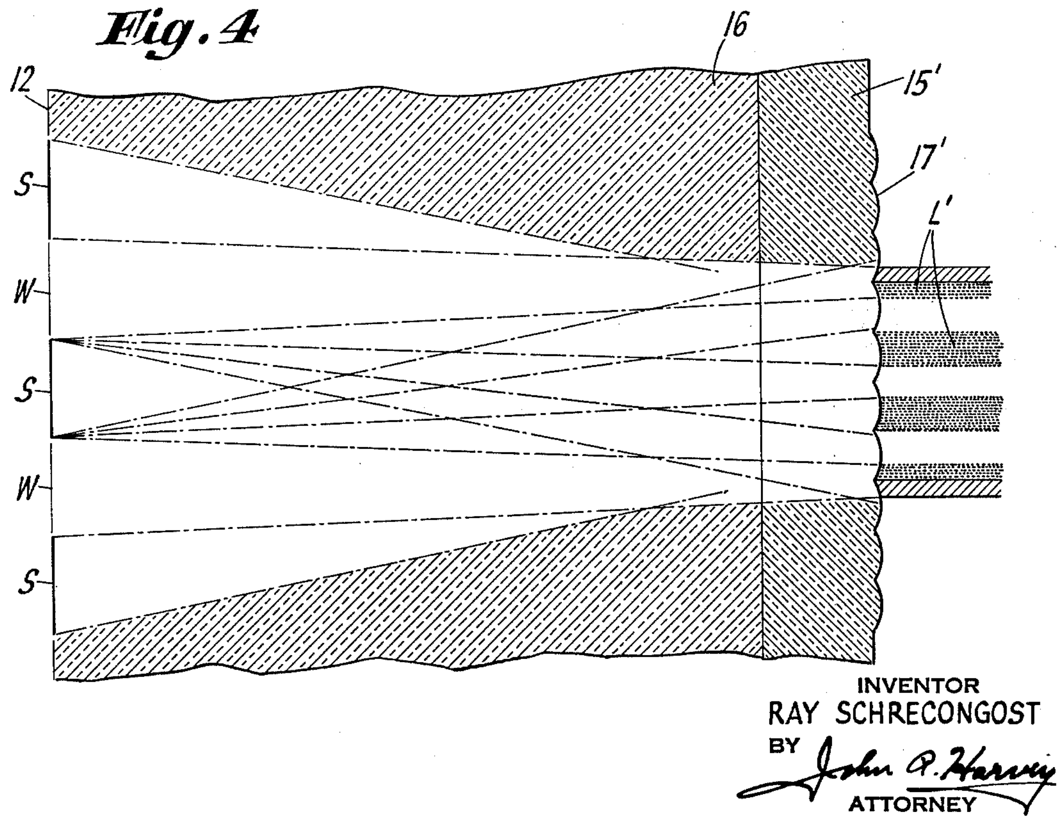
Fig. 4 illustrates an enlarged cross-sectional view of a small section of screen embodying the present invention in a modified form.

Fig. 4 illustrates in magnified cross-sectional view a fragmentary portion of the face plate of an image reproducing device having a lens structure embodying the present invention in a modified form. This structure is essentially similar to that of Fig. 2, similar elements being designated by similar reference numerals and analogous elements by similar reference numerals primed, except that the lens elements 17' which are formed on one surface of the member 15' are of convex or positive-convergent cylindrical configuration. In this form of lens construction, it has been found preferable in practice to provide lens elements 17' having widths which are one-half to one-fourth or even less of the width of the trace S and having focal lengths which again are related to the width of line trace and the distance of the lens elements from the screen 12. Here also the parameters of the lens elements 17' are selected by conventional lends formulae to provide the desired optical widening or magnification of the width of the line trace S. The operation of this form of lens structure is well-known from optical principles and is diagrammatically illustrated by the projected light rays L'. It will be understood that these lens elements 17' have substantially uniform convex cylindrical cross-sectional configuration along their length and that they are positioned substantially parallel to the line traces S in use.

It is well-known that one undesirable yet inherent characteristic of a conventional picture tube, having a relatively smooth glass face plate, is that a room light may be so placed that its incident rays of light upon the face plate have such angle that they are reflected back to the eyes of the observer to produce an annoying bright spot of light upon the reproduced image. It will be apparent that the lens structure of the present invention has the important advantage that it greatly reduces the annoying effect of such reflections since incident light from a room source becomes quite well refracted by the lenticular surface of the lens structure and a much smaller portion of the incident light energy reaches the eyes of the observer. This characteristic may be further enhanced by the lens structure of Figs. 5 and 6 in which the lens elements 20 in Fig. 5 are of semi-cylindrical concave configuration so that incident rays R of light are reflected downward by substantially all portions of the lens surface and very little if any of such light energy can thus be reflected to the eyes of the observer. Fig. 6 illustrates the lens configuration for convex semi-cylindrical lenses, and again it will be observed that incident rays of light are reflected downward and away from the eyes of an observer. Except for the particular lens configurations shown in Figs. 5 and 6, the lens elements otherwise have widths and focal lengths selected as explained above in connection with Figs. 2, 3 and 4.

When the lens structure is formed in one surface of a member of transparent sheet material as above mentioned, it will be understood that the material is shaped to have curvilinear configuration corresponding to that of the face plate of the image reproducing device with which the lens structure is used. The sheet member is then in reasonably close contact with the outer surface of the face plate of the image reproducing device over the image reproducing area. A suitable material for this purpose is a cellulose acetate material. While the sheet of material may simply be mechanically held in contact with the face plate of the reproducing device, it is convenient to use a suitable cement between the sheet member and the face plate to form an integral structure. Any suitable adhesive may be used for this purpose.

From the foregoing description of the invention, it will be apparent that a lens structure embodying the invention is of simple and inexpensive construction yet effects widening or magnification of the line traces to eliminate the objectionable dark spaces which otherwise appear when the width of the line trace is selected to provide good image resolution along the line. The lens structure of the invention is well adapted to mass-scale low-cost production and enables optimized vertical and horizontal image resolutions in a simple, effective manner without increased cost or complexity of the scanning system used with the reproducing device. There is the further advantage that a lens structure embodying the invention substantially reduces undesirable reflections from the picture tube to the eyes of an observer from sources of room illumination.

While there have been described what are at present considered to be the preferred embodiments of the invention, it will be apparent to those skilled in the art that various changes and modifications may be made therein without departing from the invention.

What I claim is:

1. A lens structure for a television image reproducing device, which has a surface providing a raster of substantially parallel line traces of which alternate lines are illuminated and intervening lines are dark, comprising a member having a lenticular surface which in use is adapted to be positioned in spaced relation to said first-mentioned surface and is formed of substantially contiguous elongated lens elements each positioned for use substantially parallel to one of said line traces and having the same type of lens cross-sectional configuration along its length.

2. A lens structure for a television image reproducing device, which has a surface providing a raster of substantially parallel line traces of which alternate lines are illuminated and intervening lines are dark, comprising a member having a lenticular surface in spaced relation to said first-mentioned surface and formed of substantially contiguous elongated lens elements each positioned substantially parallel to one of said line traces and having a substantially uniform lens cross-sectional configuration along its length.

3. A lens structure for a television image reproducing device, which has a surface providing a raster of substantially parallel line traces of which alternate lines are illuminated and intervening lines are dark, comprising a member having a lenticular surface which in use is adapted to be positioned in spaced relation to said first-mentioned surface and is formed of substantially contiguous elongated lens elements each positioned for use substantially parallel to one of said line traces and having substantially uniform incremental lengths of cylindrical-lens cross-sectional configuration.

4. A lens structure for a television image reproducing device, which has a surface providing a raster of substantially parallel lines traces of which alternate lines are illuminated and intervening lines are dark, comprising a member having a lenticular surface which in use is adapted to be positioned in spaced relation to said first-mentioned surface and is formed of substantially contiguous elongated lens elements each positioned for use substantially parallel to one of said line traces and having substantially uniform incremental lengths of negative-divergent cylindrical lens cross-sectional configuration.

5. A lens structure for a television image reproducing device, which has a surface providing a raster of substantially parallel line traces of which alternate lines are illuminated and intervening lines are dark with the illuminated and dark lines of approximately equal widths, comprising a member having a lenticular surface which in use is adapted to be positioned in spaced relation to said first-mentioned surface and is formed of substantially contiguous elongated lens elements of said line width and each positioned for use substantially parallel to one of the line traces of said raster, each of said lens elements having a substantially uniform cross-sectional configuration along its length and having a focal length substantially larger in value than said line width.

6. A lens structure for a television image reproducing device, which has a surface providing a raster of substantially parallel line traces of which alternate lines are illuminated and intervening lines are dark, comprising a member having a lenticular surface which in use is adapted to be positioned in spaced relation to said first-mentioned surface and is formed of substantially contiguous elongated lens elements each positioned for use substantially parallel to one of said line traces and having a substantially uniform positive-convergent cross-sectional lens configuration along its length.

7. A lens structure for a television image reproducing device, which has a surface providing a raster of substantially parallel line traces of which alternate lines are illuminated and intervening lines are dark with the illuminated and dark lines of approximately equal width, comprising a member having a lenticular surface which in use is adapted to be positioned in spaced relation to said first-mentioned surface and is formed of substantially contiguous cylindrical elongated lens elements of width substantially less than said line width with each of said element positioned for use substantially parallel to one of said line traces and having a substantially uniform positive-convergent lens cross-sectional configuration along its length.

References Cited in the file of this patent

UNITED STATES PATENTS

| | | |
|---|---|---|
| Re. 22,115 | Herbst | June 16, 1942 |
| 2,254,057 | Arni et al. | Aug. 26, 1941 |
| 2,260,228 | Moller et al. | Oct. 21, 1941 |
| 2,354,591 | Goldsmith | July 25, 1944 |

FOREIGN PATENTS

| | | |
|---|---|---|
| 215,086 | Great Britain | May 1, 1924 |
| 1,015,313 | France | July 2, 1952 |
| 708,713 | Great Britain | May 12, 1954 |